United States Patent
Marques et al.

(10) Patent No.: US 9,415,330 B2
(45) Date of Patent: Aug. 16, 2016

(54) BLENDS OF POLYPROPYLENE POLYGLYCOL AND PHENOLIC GLYCOL ETHERS AND METHOD OF FOAM CONTROL USING SUCH BLEND

(75) Inventors: Yuri Alencar Marques, Botucatu (BR); Marcelo Beck Graziani, Campinas (BR)

(73) Assignee: Dow Brasil Sudeste Industrial LTDA., Sao Paulo (BR)

( * ) Notice: Subject to any disclaimer, the term of this patent is extended or adjusted under 35 U.S.C. 154(b) by 113 days.

(21) Appl. No.: 13/989,935

(22) PCT Filed: Dec. 1, 2011

(86) PCT No.: PCT/US2011/062937
§ 371 (c)(1),
(2), (4) Date: Jul. 2, 2013

(87) PCT Pub. No.: WO2012/075320
PCT Pub. Date: Jun. 7, 2012

(65) Prior Publication Data
US 2013/0277279 A1    Oct. 24, 2013

Related U.S. Application Data

(60) Provisional application No. 61/418,930, filed on Dec. 2, 2010.

(51) Int. Cl.
*B01D 19/04* (2006.01)
*B03D 1/08* (2006.01)

(52) U.S. Cl.
CPC ............... *B01D 19/04* (2013.01); *B03D 1/082* (2013.01); *B03D 2201/007* (2013.01)

(58) Field of Classification Search
CPC .... B01D 19/0404; B01D 19/04; B03D 1/085; B03D 2201/007
USPC ........................................................ 524/375
See application file for complete search history.

(56) References Cited

U.S. PATENT DOCUMENTS

| 2,695,101 A | 11/1954 | Booth et al. |
| 2,611,485 A | 9/1962 | Tveter et al. |
| 5,900,899 A | 5/1999 | Ichizawa et al. |

FOREIGN PATENT DOCUMENTS

| EP | 0 927 567 | 7/1999 |
| EP | 2420559 | 2/2012 |
| WO | WO2009/125335 | 10/2009 |

OTHER PUBLICATIONS

A Guide to Glycols. Dow. 2003.*
Chinese Office Action dated Jun. 18, 2014; from Chinese counterpart Application No. 201180058123.5.
Chinese Office Action Dec. 3, 2014; from Chinese counterpart Application No. 201180058123.5.
EP Office Action dated Jul. 30, 2013; from EP counterpart Application No. 11796884.2.
PCT Search Report dated Mar. 15, 2013; from PCT counterpart Application No. PCT/US11/62937.
IPRP dated Jan. 29, 2013; from PCT counterpart Application No. PCT/US11/62937.
Japanese Office Action dated Oct. 8, 2015; from Japanese counterpart Application No. 2013-542184.
Japanese Response to Office Action dated Dec. 24, 2015; from Japanese counterpart Application No. 2013-542184.

* cited by examiner

*Primary Examiner* — John Uselding
(74) *Attorney, Agent, or Firm* — Brooks, Cameron, & Huebsch, PLLC

(57) ABSTRACT

A blend comprising from 1 to 99 weight percent one or more polypropylene glycols wherein each polypropylene glycol has a weight average molecular weight of greater than or equal to 1000 grams/mole and from 1 to 99 weight percent one or more dipropylene glycol phenyl ethers and/or diethylene glycol phenyl ethers wherein the blend has a viscosity (ASTM D445, @ 25° C.) of less than or equal to 400 cSt and viscosity (ASTM D445, @ 40° C.) of less than or equal to 200 cSt, is provided. Processes using the blend in mining applications are also provided.

7 Claims, No Drawings

US 9,415,330 B2

BLENDS OF POLYPROPYLENE POLYGLYCOL AND PHENOLIC GLYCOL ETHERS AND METHOD OF FOAM CONTROL USING SUCH BLEND

FIELD OF THE INVENTION

The invention relates to polypropylene polyglycol and phenolic glycol ether blends and methods for controlling foaming in mining processes using such blends.

BACKGROUND OF THE INVENTION

Excessive foaming is an issue in flotation process in the mining industry as it can negatively affect the efficiency of the mining process. Foam control agents are often highly viscous fluids that require dilution in organic solvents to achieve lower viscosities suitable for the use in the flotation process. The organic solvent might also contribute to the efficacy and foam control performance of the solution.

Currently, highly flammable volatile organic solvents are used to dilute high molecular weight polypropylene glycol in foam control solutions. A foam control solution for flotation processes in mining that has improved handling, safety, and environmental profile, with similar performance, when compared to flammable organic based foam control solutions that are currently used, would be desirable.

SUMMARY OF THE INVENTION

The instant invention is a composition, method of producing the same, articles made therefrom, and methods for making such articles.

In one embodiment, the instant invention provides a blend comprising from 1 to 99 weight percent one or more polypropylene glycols wherein each polypropylene glycol has a weight average molecular weight of greater than or equal to 1000 grams/mole and from 1 to 99 weight percent one or more dipropylene glycol phenyl ethers, wherein the blend has a viscosity (ASTM D445, @ 25° C.) of less than or equal to 400 cSt and a viscosity (ASTM D445, @ 40° C.) of less than or equal to 200 cSt.

In another embodiment, the invention provides a blend in accordance with any of the preceding embodiments, except that the blend comprises from 30 to 40 weight percent one or more propylene glycols and from 60 to 70 weight percent one or more dipropylene glycol phenyl ethers.

In another embodiment, the invention provides a blend in accordance with any of the preceding embodiments, except that the blend comprises from 60 to 70 weight percent one or more propylene glycols and from 30 to 40 weight percent one or more dipropylene glycol phenyl ethers.

In another embodiment, the invention provides a blend in accordance with any of the preceding embodiments, except that the blend comprises from 45 to 55 weight percent one or more propylene glycols and from 45 to 55 weight percent one or more dipropylene glycol phenyl ethers.

In another embodiment, the invention provides a blend in accordance with any of the preceding embodiments, except that the polypropylene glycol has a weight average molecular weight greater than or equal to 4000 grains/mole.

In another embodiment, the invention provides a blend in accordance with any of the preceding embodiments, except that each of the one or more dipropylene phenyl ethers has a solvent flash point of greater than or equal to 70° C.

In another embodiment, the invention provides a blend in accordance with any of the preceding embodiments, except that each of the one or more dipropylene glycol phenyl ethers has a solvent flash point of greater than or equal to 100° C.

In another embodiment, the invention provides a blend in accordance with any of the preceding embodiments, except that the blend further comprises from greater than 0 to 3 weight percent water.

In another embodiment, the invention provides a blend in accordance with any of the preceding embodiments, except that the one or more polypropylene glycols are mono-ols, di-ols, tri-ols, or any combination of two or more thereof.

In another embodiment, the invention provides a mining flotation process comprising addition of the blend, according to any of the preceding embodiments, to a mineral processing fluid.

In another embodiment, the invention provides a mining flotation process of the preceding embodiment, wherein the mineral processing fluid is a fluid used in a process selected from the group consisting of coal processing, selective precipitation, alumina processing, hard rock mining, precious metal recovery, brine clarification, sand and gravel washing, and combinations thereof.

In an alternative embodiment, the instant invention provides a blend consisting essentially of from 1 to 99 weight percent one or more polypropylene glycols, wherein each polypropylene glycol has a weight average molecular weight of greater than or equal to 1000 grams/mole and from 1 to 99 weight percent one or more dipropylene phenyl ethers, wherein the blend has a viscosity (ASTM D445, @ 25° C.) of less than or equal to 400 cSt and a viscosity (ASTM D445, @ 40° C.) of less than or equal to 200 cSt.

In an alternative embodiment, the invention provides a mining flotation process comprising the addition of an antifoaming agent consisting essentially of the blend, according to any of the preceding embodiments, to a mineral processing fluid.

DETAILED DESCRIPTION

The instant invention is a blend having foam control properties and a method of using the blend in controlling foam in mining operations.

The blend of the invention comprises from 30 to 70 weight percent one or more polypropylene glycols, wherein each polypropylene glycol has a weight average molecular weight of greater than or equal to 2000 grams/mole and from 30 to 70 weight percent one or more propylene glycol phenyl ethers, wherein the blend has a viscosity (ASTM D445, @ 25° C.) of less than or equal to 400 cSt and a viscosity (ASTM D445, @ 40° C.)—of less than or equal to 200 cSt.

The one or more polypropylene glycols useful in the inventive blend have a weight average molecular weight of greater than or equal to 1000 grams/mole. All individual values and sub ranges from greater than or equal to 1000 grams/mole are included herein and disclosed herein; for example, the Mw of the polypropylene glycol can be from a lower limit of 1000, 1500, 2000, 2500, 3000, 3500 or 4000 grams/mole.

The total amount of the one or more polypropylene glycols in the inventive blend may range from 30 to 70 weight percent. All individual values and sub ranges from 30 to 70 weight percent are included herein and disclosed herein; for example, the total amount of the one or more polypropylene glycols can be from a lower limit of 30, 35, 40, 45, 50, 55, 60 or 65 weight percent to an upper limit of 35, 40, 45, 50, 55, 60, 65 or 70 weight percent. For example, the total amount of the one or more polypropylene glycols may be in the range of from 30 to 70 weight percent, or in the alternative, the total amount of the one or more polypropylene glycols may be in the range of from 50 to 70 weight percent, or in the alternative, the total amount of the one or more polypropylene glycols may be in the range of from 55 to 70 weight percent.

Polypropylene glycols, which may be used in embodiments of the inventive blend, include high molecular weight polypropylene glycols typically used as foam control agents. Such polypropylene glycols have a functionality of 1 or higher (e.g., mono-ol, di-ols, tri-ols and any combination of two or more of the foregoing).

One exemplary polypropylene glycol is POLYPROPYLENE GLYCOL P 4000 (PPG4000) which is a linear polymer containing two terminal hydroxyl groups having a molecular weight of 4000 gram/mole, a specific gravity (ASTM D892) of 1.004 (25/25° C.); average viscosity @ 40° C. (ASTM D 445/446) of 455 cSt; pour point of −26° C.; refractive index (ASTM D 1218) @ 25° C. of 1.45; and density @ 25° C. of 8.36 lb/gal.

The inventive blends also comprise from 30 to 70 weight percent one or more dipropylene phenyl ethers (DiPPh) and/or diethylene glycol phenyl ethers (DiEPh). All individual values and sub ranges from 30 to 70 weight percent are included herein and disclosed herein; for example, the total amount of the one or more DiPPh and/or DiEPh can be from a lower limit of 30, 35, 40, 45, 50, 55, 60 or 65 weight percent to an upper limit of 35, 40, 45, 50, 55, 60, 65 or 70 weight percent. For example, the total amount of the one or more DiPPh and/or DiEPh may be in the range of from 30 to 70 weight percent, or in the alternative, the total amount of the one or more DiPPh and/or DiEPh may be in the range of from 50 to 70 weight percent, or in the alternative, the total amount of the one or more DiPPh and/or DiEPh may be in the range of from 55 to 70 weight percent. As used herein, the term "one or more DiPPh and/or DiEPh" means one or more DiPPh, one or more DiEPh, or one or more DiPPh in combination with one or more DiEPh.

Dipropylene glycol phenyl ethers, which may be used in some embodiments of the inventive blend, have a solvent flash point of greater than or equal to 100° C. All individual values and sub ranges from greater than or equal to 100° C. are included herein and disclosed herein; for example, the solvent flash point of each one of the DiPPh can be from a lower limit of 100, 120, 140, 160, 180, 200, 220, 240 or 260° C.

Exemplary DiPPh which may used in embodiments of the inventive blend include a carbinol-ended polypropylene glycol homopolymer mono-ol having a molecular weight of about 4100 (UCON™ LB 1715, available from The Dow Chemical Company); and a polyoxyethylene-polyoxypropylene copolymer (about a 1:1 mole ratio) mono-ol having a molecular weight of about 6000 (UCON™ 50 HB 5100). Other exemplary DiPPh which are useful in embodiments of the inventive blend include the ethylene-based glycol ethers available under the trade names CELLOSOLVE™, CARBITOL™, and ECOSOFT™, which are characterized by excellent solvency, chemical stability, and compatibility with water and a number of organic solvents. Yet other exemplary DiPPh and DiEPh which may be used in embodiments of the inventive blend include those available from The Dow Chemical Company under the trade name DOWANOL™ P series, including for example, DOWANOL™ PPh Glycol Ether, DOWANOL™ DiPPh Technical, DOWANOL™ EPh Glycol Ether, and DOWANOL™ DiEPh Glycol Ether.

The inventive blend may be used in any of a number of mineral processing applications including coat processing, selective precipitation, alumina processing, hard rock mining, precious metal recovery, brine clarification and sand and gravel washing, where polypropylene glycol foam control agents diluted in organic solvents are currently useful. In contrast to the use of low flash point organic solvents/polypropylene glycols, the inventive blend provides improved environmental, health and safety profiles. As used herein, the term "low flash point organic solvent" means solvents with a flash point lower than 70° C. As can be seen in Table 1, the Comparative Examples are flammable while the inventive Example blends are not flammable. As used herein, the term "flammable" means substances with flash points (as measured, using the Cleveland open cup method of ASTM D 92) below or equal to 60.5° C. (141° F.). Additionally, the inventive blend may be used in other applications where polypropylene glycol/organic solvents are used as foam control agents, including for example, fermentation processes and water treatment processes.

EXAMPLES

The following examples illustrate the present invention but are not intended to limit the scope of the invention.

An Inventive Example A was prepared by blending DiPPh with PPG 4000 at a ratio of 1:3. Inventive Example A was clear and stable, with no phase separation being observed at room temperature and at 40° C. A Comparative Example A was prepared by blending n-butanol with PPG4000 at ratio of 3:1. The viscosities of the solutions were compared. At 40° C., the Comparative Example A resulted in a kinematic viscosity of 79 cSt; the Inventive Example A resulted in a kinematic viscosity of 205 cSt. Pure PPG 4000 resulted in a kinematic viscosity of 382 cSt. Inventive Example A and Comparative Example A were submitted to a standard laboratory flotation cell, and both solutions were able to control foam.

Additionally, Table 1 illustrates the physical properties of Comparative Examples 1-10 and Inventive Examples 1-3 (the formulations of which are shown in Table 1). The Inventive Examples show an improved environmental, health and safety profile over the Comparative Examples, as well as equal foam control performance in mining flotation processes, as determined by visual inspection in a pilot laboratory flotation cell.

Kerosene used in preparation of Comparative Examples 2-4 was industrial grade kerosene available from NATURELLI QUIMICA, containing <0.1% benzene. White spirits used in preparation of Comparative Examples 5-7 were industrial grade white spirits manufactured by CORAL CORALUX following the Brazilian standard ABNT NBR 11.702 04/92, having a typical aromatic content of less than or equal to 0.1% by volume. Comparative Examples 8-10 were prepared using P.A. grade ethanol from VETEC QUIMICA FINA, LTDA (Xerém, Duque de Caxias, R J, Brazil). Comparative Examples 11-13 were prepared using P.A. grade n-butanol from VETEC QUIMICA FINA LTDA (Xerém, Duque de Caxias, R J, Brazil).

Test Methods

Test methods include the following:
Solvent Flash Point
Solvent flash points for each of the neat PPG 4000 and the neat DiPPh were measured according to ASTM D-92 (1990 version) using the Cleveland Open Cup method. The Cleveland Open Cup method is particularly suited for measuring the flash points of viscous materials having a flash point of 79° C. and greater. Flash points for kerosene, white spirits and ethanol were not measured but, rather, are literature reported values. The measured and literature reported flash points are shown in Table 1.
Kinematic Viscosity
Kinematic viscosity of the Inventive and Comparative Examples was measured according to ASTM-D445 (2004).

TABLE 1

| Example | Solvent | Solvent wt % | PPG4000, wt % | Solvent flash point, °C. | Viscosity @ 25° C. (cSt) | Viscosity @ 40° C. (cSt) | Flammable Solution |
|---|---|---|---|---|---|---|---|
| Comp. Ex. 1 | None | 0 | 100 | >200° C. | 825 | 329 | No |
| Comp. Ex. 2 | Kerosene | 33% | 67% | 37-65° C. | 36 | 24 | Yes |
| Comp. Ex. 3 | Kerosene | 50% | 50% | | 13 | 9 | Yes |
| Comp. Ex. 4 | Kerosene | 67% | 33% | | 5 | 4 | Yes |
| Comp. Ex. 5 | White Spirits | 33% | 67% | 21-50° C. | 8 | 6 | Yes |
| Comp. Ex. 6 | White Spirits | 50% | 50% | | 20 | 14 | Yes |
| Comp. Ex. 7 | White Spirits | 67% | 33% | | 58 | 37 | Yes |
| Comp. Ex. 8 | Ethanol | 33% | 67% | 13° C. | 9 | 7 | Yes |
| Comp. Ex. 9 | Ethanol | 50% | 50% | | 22 | 15 | Yes |
| Comp. Ex. 10 | Ethanol | 67% | 33% | | 61 | 39 | Yes |
| Comp. Ex. 11 | n-Butanol | 33% | 67% | 36° C. | 87 | 52 | Yes |
| Comp. Ex. 12 | n-Butanol | 50% | 50% | | 45 | 28 | Yes |
| Comp. Ex. 13 | n-Butanol | 67% | 33% | | 17 | 11 | Yes |
| Inv. Ex. 1 | DiPPh | 33% | 67% | >130° C. | 392 | 172 | No |
| Inv. Ex. 2 | DiPPh | 50% | 50% | | 250 | 111 | No |
| Inv. Ex. 3 | DiPPh | 67% | 33% | | 145 | 63 | No |

The present invention may be embodied in other forms without departing from the spirit and the essential attributes thereof, and accordingly, reference should be made to the appended claims, rather than to the foregoing specification, as indicating the scope of the invention.

We claim:

1. A blend consisting essentially of (a) from 33 to 67 weight percent of one or more polypropylene glycols, based on the total weight of the blend, wherein each polypropylene glycol has a weight average molecular weight of from 3000 to 5000 grams/mole, (b) from 33 to 67 weight percent of one or more dipropylene glycol phenyl ethers and/or one or more diethylene glycol phenyl ethers, based on the total weight of the blend, and (c) optionally up to 3 weight percent of water, based on the total weight of the blend, wherein the blend has a viscosity measured according to ASTM D445 at 25° C. of less than or equal to 400 cSt and viscosity measured according to ASTM D445 at 40° C. of less than or equal to 200 cSt, wherein the blend is non-flammable as having a flash point measured using the Cleveland open cup method of ASTM D 92 greater than or equal to 60.5° C. (141° F.).

2. The blend according to claim 1 wherein the blend consisting essentially of (a) from 45 to 55 weight percent of one the or more polypropylene glycols, based on the total weight of the blend, (b) from 45 to 55 weight percent of the one or more dipropylene glycol phenyl ethers and/or one or more diethylene glycol phenyl ethers, based on the total weight of the blend, and (c) optionally up to 3 weight percent of water, based on the total weight of the blend.

3. The blend according to claim 1 wherein each of the one or more dipropylene glycol phenyl ethers has a solvent flash point of greater than or equal to 70° C.

4. The blend according to claim 1 wherein each of the one or more dipropylene glycol phenyl ethers has a solvent flash point of greater than or equal to 120° C.

5. The blend according to claim 1 wherein the one or more polypropylene glycols are mono-ols, di-ols, tri-ols, or any combination of two or more thereof.

6. A mining flotation process comprising addition of the blend according to claim 1 to a mineral processing fluid.

7. The process according to claim 6, wherein the mineral processing fluid is a fluid used in a process selected from the group consisting of coal processing, selective precipitation, alumina processing, hard rock mining, precious metal recovery, brine clarification, sand and gravel washing, and combinations thereof.

* * * * *